United States Patent
Chavda

(10) Patent No.: US 7,623,463 B2
(45) Date of Patent: Nov. 24, 2009

(54) PERFORMANCE EVALUATION OF A NETWORK-BASED APPLICATION

(75) Inventor: Kavita Chavda, Roswell, GA (US)

(73) Assignee: International Business Machines Corporation, Armonk, NY (US)

(*) Notice: Subject to any disclaimer, the term of this patent is extended or adjusted under 35 U.S.C. 154(b) by 680 days.

(21) Appl. No.: 11/223,096

(22) Filed: Sep. 9, 2005

(65) Prior Publication Data

US 2007/0061443 A1    Mar. 15, 2007

(51) Int. Cl.
*H04L 12/26* (2006.01)
*G06F 11/00* (2006.01)
*G06F 15/173* (2006.01)

(52) U.S. Cl. ................. 370/241; 370/235; 709/224

(58) Field of Classification Search ...... 370/235–236.2, 370/241–241.1; 709/223–226; 718/100–101
See application file for complete search history.

(56) References Cited

U.S. PATENT DOCUMENTS 5,974,237 A    10/1999    Shurmer et al.
6,286,046 B1 *  9/2001    Bryant ..................... 709/224
6,389,331 B1    5/2002    Jensen et al.
6,564,342 B2    5/2003    Landan
7,072,800 B1 *  7/2006    Fernandez et al. ......... 702/186
2002/0133757 A1  9/2002    Bertram et al.
2002/0152305 A1* 10/2002   Jackson et al. .............. 709/224
2002/0175956 A1 11/2002    Hand et al.
2002/0198984 A1 12/2002    Goldstein et al.
2003/0065986 A1*  4/2003   Fraenkel et al. ............... 714/47
2004/0122942 A1  6/2004    Green et al.
2004/0267691 A1 12/2004    Vasudeva

OTHER PUBLICATIONS

Compuware Vantage Brochure, Dec. 2004, pp. 1-6.

\* cited by examiner

*Primary Examiner*—Tri H Phan
(74) *Attorney, Agent, or Firm*—Anna Linne; Hoffman Warnick LLC

(57) ABSTRACT

A solution for evaluating a performance of a network-based application is provided. A transaction performed by the application is decomposed into multiple components. One or more resources for each component are identified and performance data for each identified resource is obtained while the application processes the transaction. Based on the performance data, the performance of the application is evaluated. In this manner, the performance of the application can be comprehensively evaluated.

27 Claims, 6 Drawing Sheets

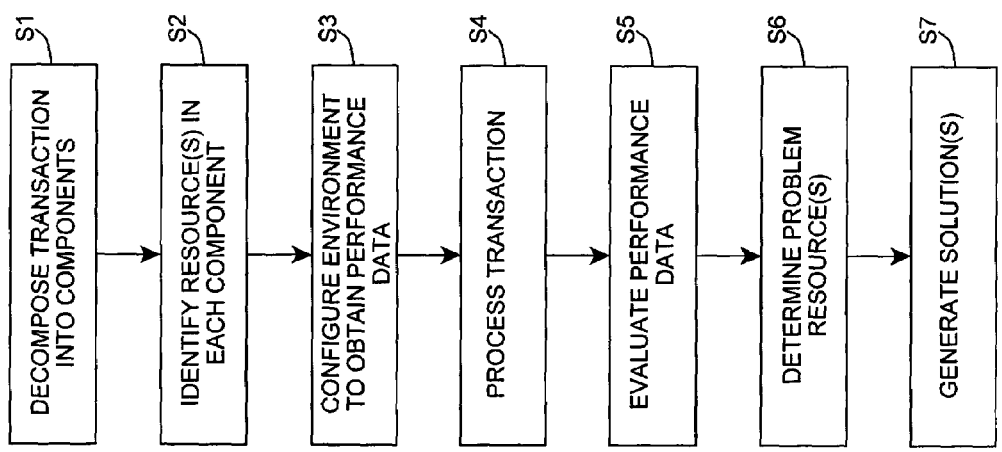

PERFORMANCE EVALUATION OF A NETWORK-BASED APPLICATION

FIELD OF THE INVENTION

The invention relates generally to evaluating the performance of an application, and more particularly, to evaluating a performance of a network-based application.

BACKGROUND OF THE INVENTION

The deployment of a network-based application, such as the Siebel Call Center application, introduces many infrastructure challenges. For example, from a capacity perspective, it is particularly difficult to plan an appropriate network capacity during the pre-deployment phase(s). Further, from a performance perspective, it is difficult to determine the cause(s) of performance issues after deployment of the network-based application.

To date, there is no effective solution for addressing these challenges. As a result, network-based applications are currently deployed without an ability to determine all performance drivers, without an ability to realistically predict response times that end users may receive as network conditions vary (e.g., due to jitter, latency, bandwidth, and/or the like), etc. These inabilities result in an increased risk to the deployment, an increase in end user dissatisfaction and confidence in the application, increases in network infrastructure costs, and the like.

To this extent, a need exists for a solution for evaluating a performance of a network-based application.

SUMMARY OF THE INVENTION

The invention provides a solution for evaluating a performance of a network-based application. A transaction performed by the application is decomposed into multiple components. One or more resources for each component are identified and performance data for each identified resource is obtained while the application processes the transaction. Based on the performance data, the performance of the application is evaluated. In one embodiment, the performance data is compiled into a performance map that can be evaluated. Further, baseline data can be used to identify potential problem resource(s). Still further, a network can be simulated to obtain the baseline data and/or to evaluate the performance of the application prior to its deployment. In this manner, the performance of the application can be comprehensively evaluated.

A first aspect of the invention provides a method of evaluating a performance of a network-based application, the method comprising: decomposing a transaction for the network-based application into a plurality of components, wherein the plurality of components include a client component, a network component, and a server component; identifying a plurality of resources used by the network-based application, wherein the plurality of resources include a client component resource, a network component resource, and a server component resource; obtaining performance data for each of the plurality of resources based on a processing of the transaction by the network-based application; and evaluating the performance of the network-based application based on the performance data.

A second aspect of the invention provides a system for evaluating a performance of a network-based application, the system comprising: a system for decomposing a transaction for the network-based application into a plurality of components, wherein the plurality of components include a client component, a network component, and a server component; a system for identifying a plurality of resources used by the network-based application, wherein the plurality of resources include a client component resource, a network component resource, and a server component resource; a system for obtaining performance data for each of the plurality of resources based on a processing of the transaction by the network-based application; and a system for evaluating the performance of the network-based application based on the performance data.

A third aspect of the invention provides a program product stored on a computer-readable medium, which when executed, enables a computer infrastructure to evaluate a performance of a network-based application, the program product comprising computer program code for enabling the computer infrastructure to perform the method steps of: decomposing a transaction for the network-based application into a plurality of components, wherein the plurality of components include a client component, a network component, and a server component; identifying a plurality of resources used by the network-based application, wherein the plurality of resources include a client component resource, a network component resource, and a server component resource; obtaining performance data for each of the plurality of resources based on a processing of the transaction by the network-based application; and evaluating the performance of the network-based application based on the performance data.

A fourth aspect of the invention provides a method of deploying a system for evaluating a performance of a network-based application, the method comprising: providing a computer infrastructure operable to: decompose a transaction for the network-based application into a plurality of components, wherein the plurality of components include a client component, a network component, and a server component; identify a plurality of resources used by the network-based application, wherein the plurality of resources include a client component resource, a network component resource, and a server component resource; obtain performance data for each of the plurality of resources based on a processing of the transaction by the network-based application; and evaluate the performance of the network-based application based on the performance data.

A fifth aspect of the invention provides a business method for evaluating a performance of a network-based application, the business method comprising managing a computer infrastructure that performs each of the steps of the invention; and receiving payment based on the managing step.

A sixth aspect of the invention provides a method of generating a system for evaluating a performance of a network-based application, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 6 shows illustrative process steps that can be performed according to an embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the invention provides a solution for evaluating a performance of a network-based application. A transaction performed by the application is decomposed into multiple components. One or more resources for each component are identified and performance data for each identified resource is obtained while the application processes the transaction. Based on the performance data, the performance of the application is evaluated. In one embodiment, the performance data is compiled into a performance map that can be evaluated. Further, baseline data can be used to identify potential problem resource(s). Still further, a network can be simulated to obtain the baseline data and/or to evaluate the performance of the application prior to its deployment. In this manner, the performance of the application can be comprehensively evaluated.

Figure 1:
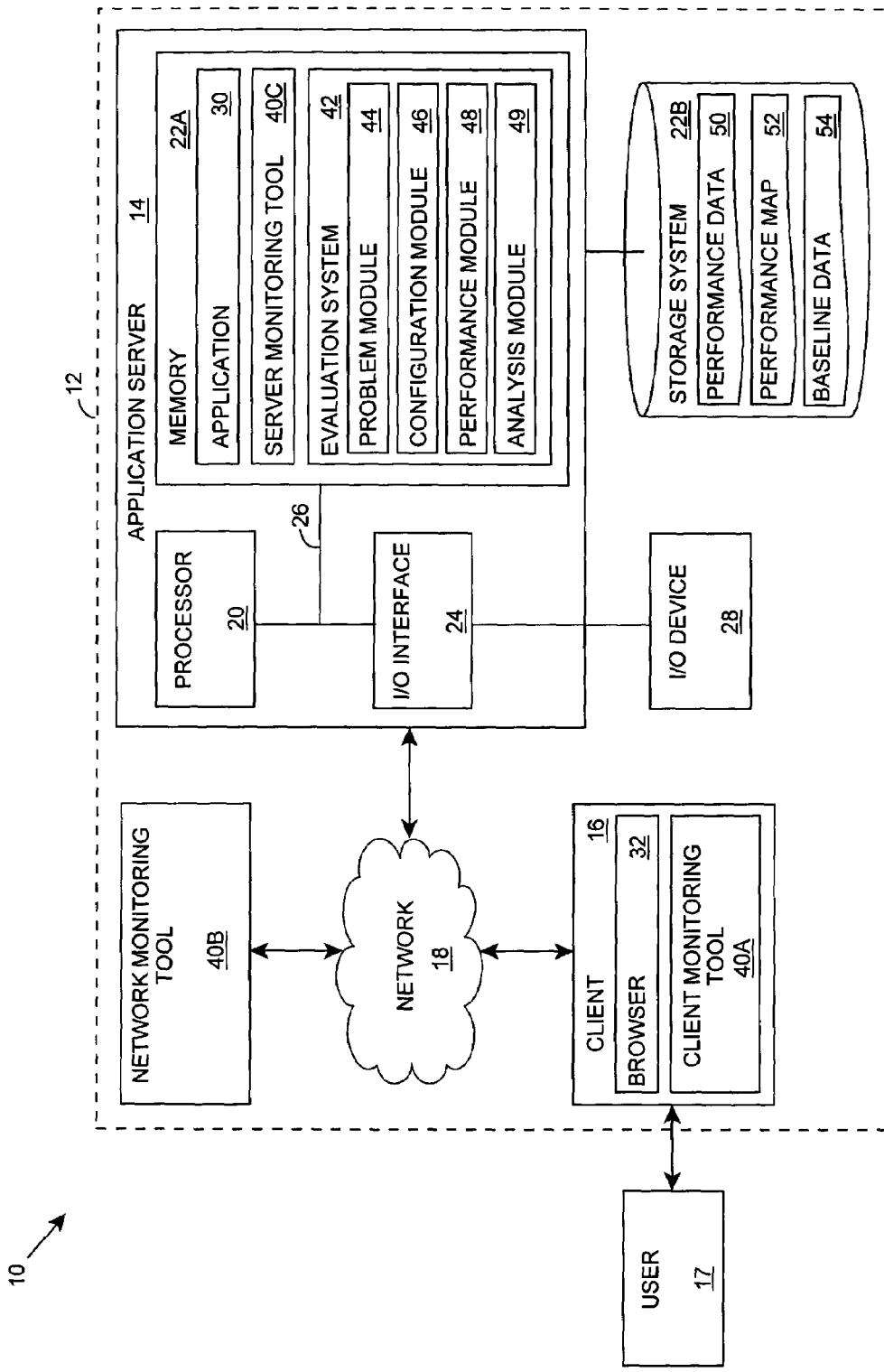
FIG. 1 shows an illustrative environment for evaluating a performance of a network-based application according to an embodiment of the invention.

Turning to the drawings, FIG. 1 shows an illustrative environment 10 for evaluating a performance of a network-based application 30 according to an embodiment of the invention. To this extent, environment 10 includes an application server 14 that can execute network-based application 30. As is known in the art, application server 14 includes a processor 20 that executes computer program code, such as application 30, that is stored in a memory 22A and/or a storage system 22B. While executing computer program code, processor 20 can read and/or write data to/from memory 22A, storage system 22B, and/or an input/output (I/O) interface 24. A bus 26 provides a communications link between each of the components in application server 14. An I/O device 28 can comprise any device that enables a user to directly interact with application server 14 or any device that enables application server 14 to communicate with one or more other computing devices, such as client 16. Application server 14 is only illustrative of various types of computer infrastructures for executing application 30. For example, in one embodiment, environment 10 comprises two or more computing devices (e.g., a server cluster) that communicate over any type of wired and/or wireless communications link, such as a network, a shared memory, or the like, to execute application 30.

In general, a user 17 uses an application, such as a browser 32, executing on a client 16 to interact with application 30 via a network 18. It is understood that client 16 can comprise the same components (processor, memory, I/O interface, etc.) as shown for application server 14. These components have not been separately shown and discussed for brevity. Network 18 can comprise any combination of one or more types of networks (e.g., the Internet, a wide area network, a local area network, a virtual private network, etc.). Further, communications between client 16 and network 18 and/or network 18 and application server 14 may utilize any combination of various types of wired and/or wireless transmission techniques and protocols.

In any event, application server 14 and client 16 each can comprise any general purpose computing article of manufacture capable of executing computer program code. However, it is understood that application server 14 and client 16 are only representative of various possible equivalent computing devices that may perform the various process steps of the invention. To this extent, in other embodiments, application server 14 and/or client 16 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Figure 2:
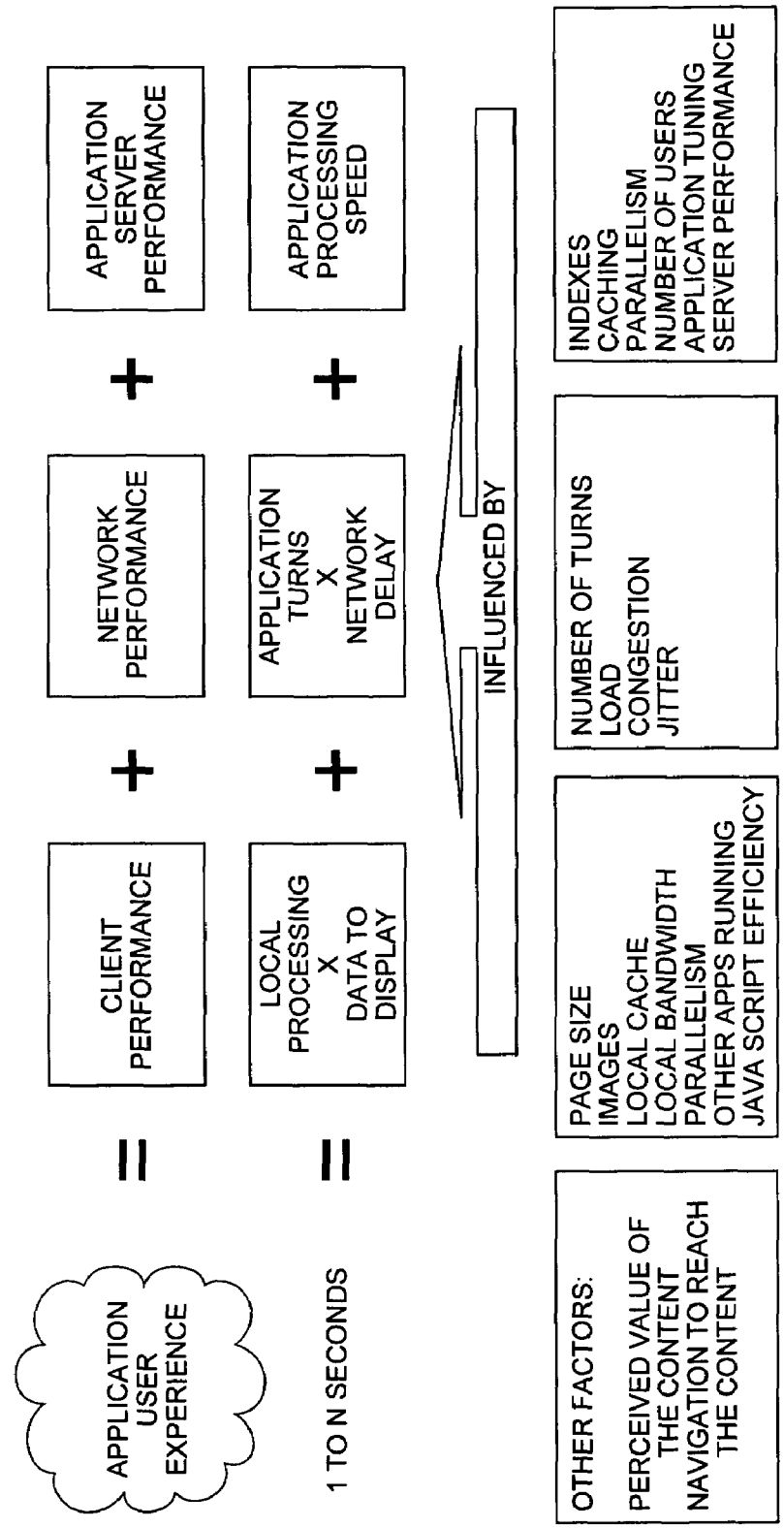
FIG. 2 shows an illustrative group of components that contribute to an overall experience for user.

In operation, user 17 interacts with browser 32 on client 16 to send/receive data/requests for data over network 18 to application 30 on application server 14. Application 30 processes the data/requests for data and sends data/requests for data to client 16 over network 18 for display and/or processing by browser 32. To this extent, FIG. 2 shows an illustrative group of components that contribute to an overall experience for user 17. Referring to FIGS. 1 and 2, in general, various subjective factors contribute to an overall user experience. For example, a perceived value of the content requested by user 17 impacts how long user 17 is willing to wait to receive such content (e.g., a user will be willing to wait longer for more valuable content). Additionally, an amount of navigation required of user 17 to reach the content impacts a perception of the overall usability of application 30. To this extent, application 30 should generally require fewer navigation steps for information that is frequently requested. Various other subjective factors can also contribute to the application user experience as will be recognized by one in the art.

Regardless, a significant factor in the subjective user experience is an amount of time required to perform some action (e.g., locate desired information). To this extent, the overall user experience for application 30 can be quantified as a sum of the performances of various components of environment 10, e.g., client 16, network 18, and application server 14. For client 16, the performance can be measured by an amount of time required to perform local processing for the data that is to be displayed/communicated. This time is influenced by such factors as a page size, a number of images, a local cache, a local communications bandwidth, an amount of parallelism on client 16, other applications that may be running, an efficiency with which Java script(s) are processed, etc. For network 18, the performance can be measured by a total number of application turns and an amount of network delay for each turn. A "turn" is a complete communication between browser 32 and application 30 (e.g., a request followed by one or more responses). The network delay is influenced by a communications load for network 18, an amount of congestion on network 18, network 18 jitter (e.g., variability over time of the latency across network 18), etc. For application server 14, the performance can be measured by an amount of time required to process data for application 30. This time is influenced by such factors as indexes, caching, an amount of parallelism, a total number of users, application tuning, server performance, etc.

Returning to FIG. 1, as previously noted, environment 10 can evaluate a performance of application 30. To this extent, environment 10 is shown including a computer infrastructure 12 that includes various monitoring tools 40A-C. In particular, computer infrastructure 12 includes a monitoring tool 40A-C for each component. In general, each monitoring tool 40A-C can acquire performance data 50 for one or more resources of the corresponding component that are used when processing a transaction for application 30. Further, application server 14 is shown including an evaluation system 42, which enables application server 14 to evaluate the performance of application 30 based on the performance data 50. To this extent, evaluation system 42 is shown including a problem module 44, a configuration module 46, a performance module 48, and an analysis module 49. Operation of each of these systems/modules is discussed further herein. However, it is understood that some of the various systems/modules shown in FIG. 1 can be implemented independently, combined, and/or stored in memory for one or more separate computing devices that are included in computer infrastructure 12. Further, it is understood that some of the systems, modules, and/or functionality may not be implemented, or additional systems, modules, and/or functionality may be included as part of environment 10.

Regardless, the invention provides a solution for evaluating a performance of a network-based application, such as application 30. The evaluation can be performed while application 30 is being developed, as part of an ongoing monitoring of application 30, and/or in response to a problem reported by one or more users 17. In the latter case, problem module 44 can receive a performance concern for user 17. For example, user 17 may notify (e.g., via telephone, email, or the like) a service provider that manages application server 14 that performing one or more transactions using application 30 takes an excessive amount of time. The service provider can use problem module 44 to obtain data on the performance concern, such as an identity of user 17 and/or client 16, a location of user 17, one or more transactions being performed by user 17, and/or the like. Alternatively, user 17 can use problem module 44 directly to provide the data and/or problem module 44 can automatically obtain some/all of the data.

In any event, configuration module 46 can configure computer infrastructure 12 to evaluate application 30 while it performs the transaction(s). To this extent, configuration module 46 can decompose each transaction into a plurality of components used to perform the transaction. In one embodiment, the components include a client 16 component, a network 18 component, and an application server 14 component. However, it is understood that one or more additional components could be included. For example, configuration module 46 could decompose a transaction into multiple network 18 components, one for each network over which communications occur (e.g., a LAN, the Internet, a server cluster, etc.).

Configuration module 46 can further identify a set of resources used by application 30 and browser 32 when processing the transaction(s). As used herein, a resource can comprise some or all of any of various computing elements in computer infrastructure 12 that are used when processing the transaction(s). For example, a resource can comprise an amount of memory, processing time, communications bandwidth, messages, etc. Various additional examples of resources are discussed herein. However, it is understood that the invention is not limited to these resources. To evaluate application 30 as it processes the transaction(s), configuration module 46 can identify at least one resource in each of the components. To this extent, configuration module 46 can identify at least one client component resource (e.g., memory, local bandwidth, etc.), at least one network component resource (e.g., bandwidth, messages, etc.), and at least one server component resource (e.g., database manager, web server, etc.). Configuration module 46 can identify some/all of the set of resources automatically and/or a user can identify one or more of the set of resources using an interface generated by configuration module 46. Further, configuration module 46 can obtain the set of resources from another system or can obtain a previously defined set of resources from a database.

In any event, configuration module 46 configures computer infrastructure 12 to obtain performance data 50 for each resource in the set of resources while application 30 and browser 32 are processing the transaction(s). In particular, configuration module 46 can configure one or more monitoring tools 40A-C to acquire performance data 50 for one or more corresponding resources. Monitoring tools 40A-C can comprise additional hardware and/or software that is implemented in environment 10 and/or functionality (e.g., logging capability) of a resource that is configured to acquire performance data 50. To this extent, configuration module 46 can provide one or more monitoring tools 40A-C for installation/execution on the corresponding component (e.g., client, network, server). Further, configuration module 46 can install and/or execute one or more monitoring tools 40A-C and/or configure one or more monitoring tools 40A-C to acquire the desired performance data 50.

Figure 3:
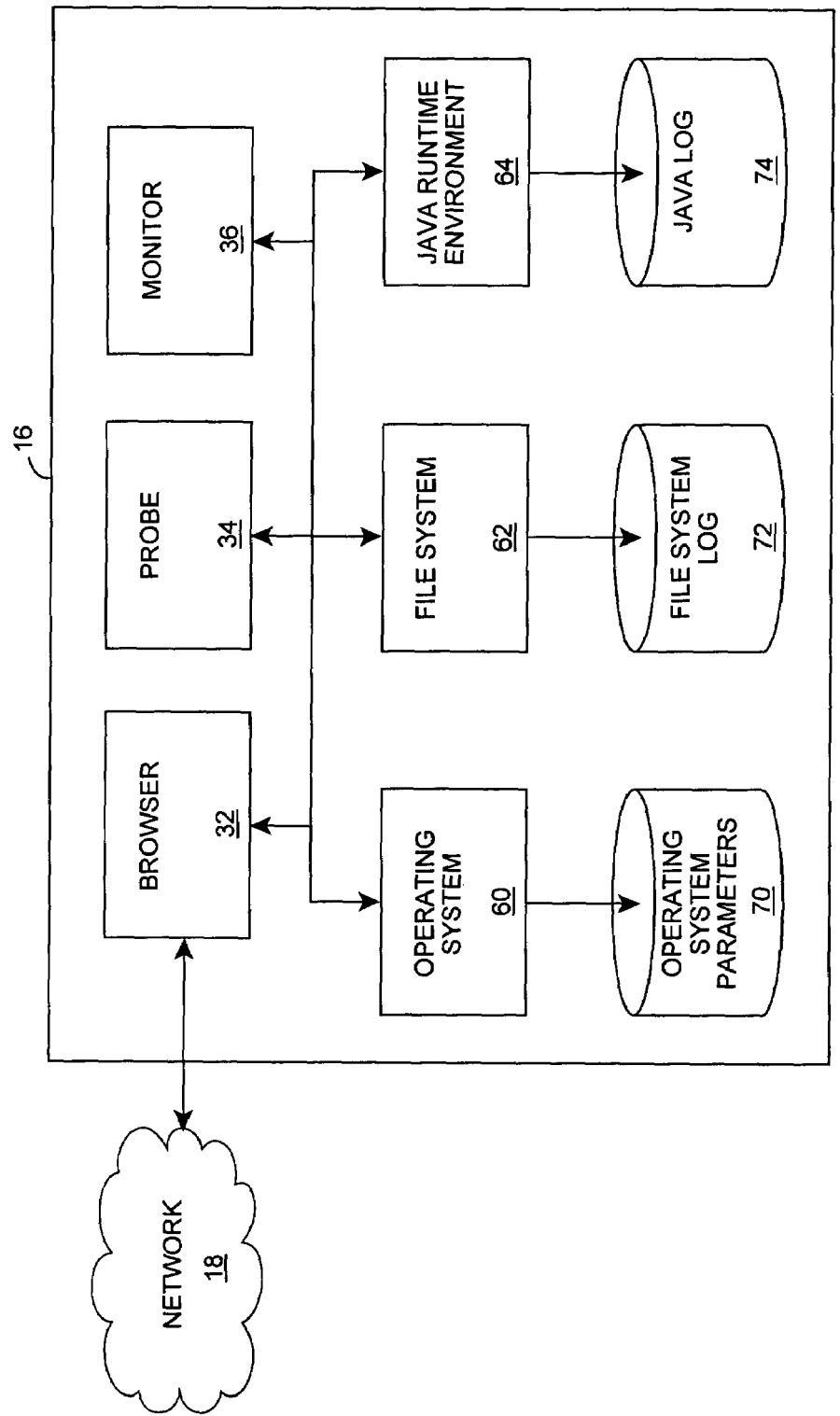
FIG. 3 shows a more detailed view of the client of FIG. 1 according to an embodiment of the invention.

For example, FIG. 3 shows a more detailed view of client 16 according to an embodiment of the invention. As discussed herein, browser 32 executes on client 16 and sends/receives data to/from application 30 (FIG. 1) via network 18. While executing on client 16, browser 32 uses various resources such as an operating system 60, a file system 62, and a Java runtime environment 64. Further, operating system 60 can be utilized to access one or more additional resources on client 16, such as a cache memory, a virtual memory, a processor, an I/O interface, etc. As a result, configuration module 46 (FIG. 1) can configure client 16 to obtain performance data 50 (FIG. 1) for each of the resources while the transaction(s) are being processed.

To this extent, configuration module 46 (FIG. 1) can install, configure, and/or execute one or more probes 34 and/or one or more monitors 36 on client 16. A probe 34 comprises a program that investigates and/or tests an operable status of a resource while a monitor 36 comprises a program that obtains performance data 50 (FIG. 1) of one or more resources. Further, configuration module 46 can configure one or more resources on client 16 to generate performance data 50, such as a log, having a desired level of detail. For example, configuration module 46 can increase a level of detail of data that is logged by a particular resource.

In any event, as browser 32 is used to process a transaction with application 30 (FIG. 1), performance data 50 (FIG. 1) for the various resources can be acquired on client 16. For example, one or more operating system parameters 70 can be recorded by one or more monitors 36. Operating system parameters 70 can include, for example, a cache memory allocation/usage, a page size/allocation, a processor utilization, a local bandwidth, and the like. Similarly, a file system log 72 can be generated by, for example, a file system monitor, based on the various operations performed by file system 62. Further, a Java log 74 can be generated by, for example, Java runtime environment 62, and can include various attributes of the utilization of Java runtime environment 64 by browser 32.

Returning to FIG. 1, configuration module 46 can further configure computer infrastructure 12 to acquire performance data 50 on network 18 while the transaction(s) are processed by application 30. To this extent, computer infrastructure 12 is shown including a network monitoring tool 40B connected to network 18. In one embodiment, network monitoring tool 40B comprises a network analyzer (e.g., "sniffer") that captures and inspects packets transmitted over network 18. For example, network monitoring tool 40B can identify one or more user sessions that are being used for communications between client 16 and application server 14. In this case, network monitoring tool 40B can track a number of bytes being communicated, a number of application turns, etc., for the messages required to process the transaction(s). Further, network monitoring tool 40B can acquire one or more network conditions for network 18, such as jitter, latency, bandwidth, and the like, as performance data 50 for network 18.

Figure 4:
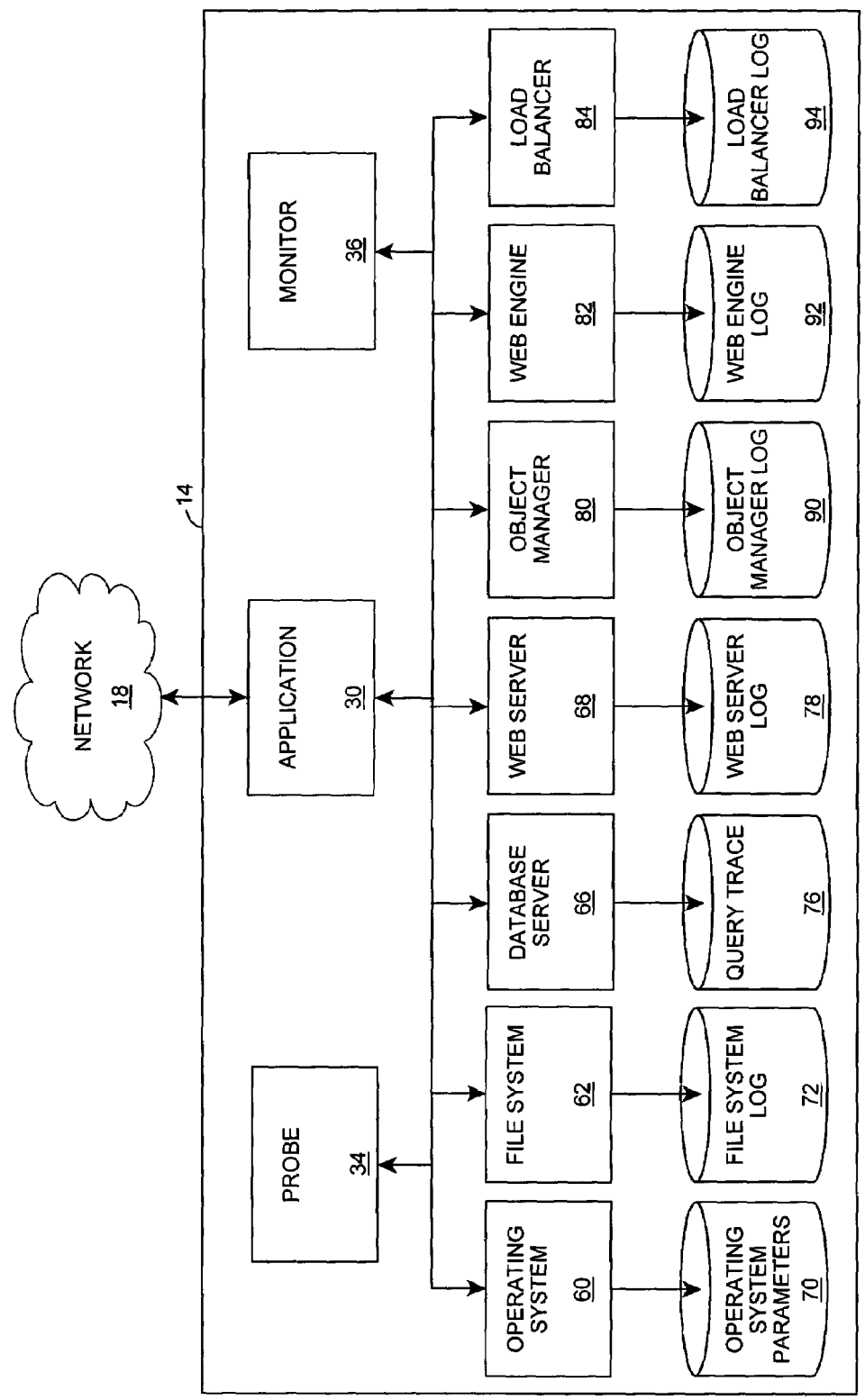
FIG. 4 shows a more detailed view of the application server of FIG. 1 according to an embodiment of the invention.

Additionally, configuration module 46 can configure computer infrastructure 12 to obtain performance data 50 for one or more resources on application server 14. For example, FIG. 4 shows a more detailed view of application server 14 according to an embodiment of the invention. As with client monitoring tool 40A (FIG. 1), server monitoring tool 40C (FIG. 1) can comprise any number of probes 34 and/or monitors 36 for acquiring performance data 50. Further, one or more resources on application server 14 can include functionality for acquiring performance data 50 independent of any probe 34 and/or monitor 36 (e.g., logging capability). As with client 16 (FIG. 1), application server 14 can acquire performance data 50, such as a set of operating system parameters 70 and/or a file system log 72, for an operating system 60 and a file system 62, respectively, on application server 14.

Application 30 can also use various other types of resources for which performance data 50 can be obtained. For example, application 30 can use a database server 66 to read/write data to/from a database. In this case, configuration module 46 (FIG. 1) can configure database server 66 and/or another program to generate a query trace 76. Further, application 30 can use a web server 68 to deliver web pages over network 18 (FIG. 1) using, for example, the hypertext transport protocol (HTTP). In this case, configuration module 46 can configure web server 68 and/or another program to generate a web server log 78. Similarly, configuration module 46 can configure application server 14 to obtain an object manager log 90 for an object manager 80 used by application 30, and a web engine log 92 for a web engine 82 used by application 30. Object manager 80 can provide an interface for database server 66. Additionally, web engine 82 can send/receive messages in an extensible markup language (XML), and can interface with web server 68. Still further, application 30 can use a load balancer 84 that distributes processing, data, etc., across multiple computing resources (e.g., servers in a server cluster, processors, memory, communications channels, etc.). In this case, configuration module 46 can configure application server 14 to obtain a load balancer log 94.

Returning to FIG. 1, it is understood that some or all of performance data 50 can be obtained specifically for the processing of the problem transaction(s). To this extent, one or more of the various monitoring tools 40A-C can be configured to only obtain performance data 50 when the particular transaction is being processed. In one embodiment, a monitoring tool 40A-C identifies a user session for the transaction. Subsequently, the user session can be provided to and utilized by one or more monitoring tools 40A-C to obtain performance data 50. In this case, an increased level of detail of logged performance data 50 and/or the generation of any performance data 50 can be limited to the processing/communicating of data for the transaction(s). However, it is understood that some monitoring tools 40A-C can generate performance data 50 regardless of the particular transaction being processed.

In any event, once the transaction(s) have been processed by computer infrastructure 12, performance module 48 can obtain performance data 50 for analysis. In particular, performance module 48 can request and/or receive performance data 50 that may be stored locally on client 16, network monitoring tool 40B, and/or various storage locations on application server 14. In this manner, performance data 50 can be compiled for easier analysis and/or more permanent storage.

Further, performance module 48 can evaluate a performance of application 30 and/or browser 32 based on performance data 50. To this extent, performance module 48 can generate a performance map 52 that illustrates the resource utilization of the various resources by application 30 and browser 32, includes performance trend analysis for one or more resources, etc. Performance map 52 can comprise multi-tiered data in which an overview of the performance can be presented and a user can "drill down" to obtain more specific details of the performance data 50 for one or more resources. For example, performance map 52 can comprise a total number of application turns that were communicated over network 18 and a total number of bytes. When desired, a user can drill down to view further details on each application turn, such as a number of bytes, an amount of time required for the application turn, etc. As a result, performance map 52 can enable a user to identify one or more potential problem areas and obtain further information on the potential problem area(s).

Figure 5:
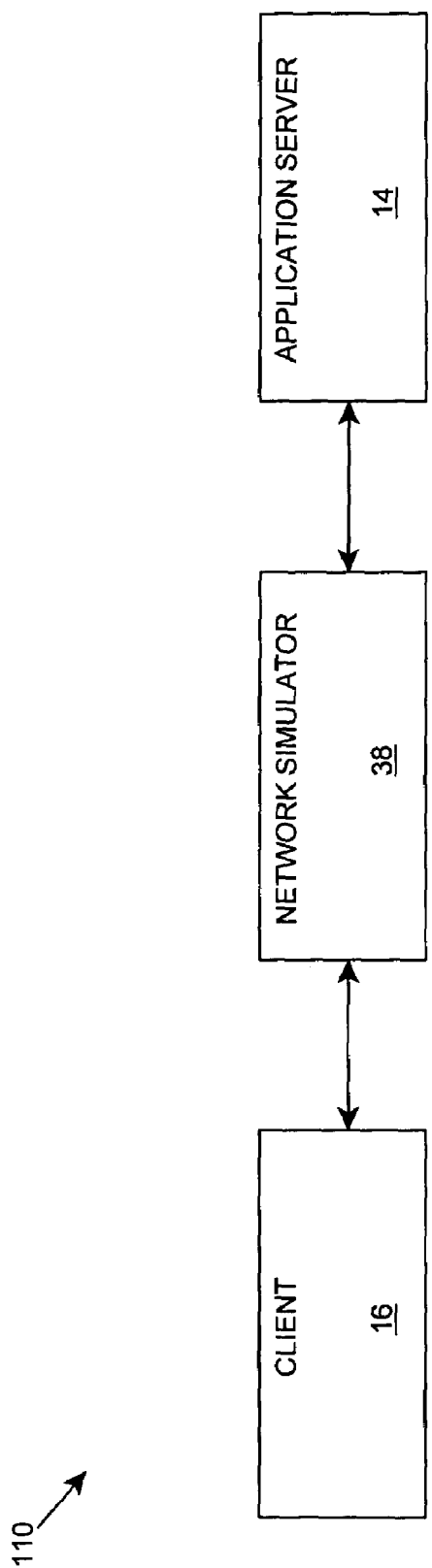
FIG. 5 shows an illustrative environment in which a network simulator simulates a network according to an embodiment of the invention.

Further, performance module 48 can automatically evaluate the performance of application 30 based on performance data 50 and/or performance map 52. In one embodiment, performance module 48 compares performance data 50 and/or performance map 52 to baseline data 54 for application 30. Baseline data 54 can comprise performance data that is obtained for one or more components during the processing of the transaction(s) over various times. Alternatively, baseline data 54 can comprise performance data that is obtained in a lab environment. To this extent, FIG. 5 shows an illustrative environment 110 in which a network simulator 38 is used to simulate a network, such as network 18. In particular, network simulator 38 can simulate various network conditions such as latency, bandwidth, jitter, etc., that can be anticipated to be present in network 18. Environment 110 can be configured to obtain performance data 50 for client 16 and/or application server 14 as discussed herein. Subsequently, performance module 48 can compile the performance data 50 and store it as baseline data 54.

Returning to FIG. 1, baseline data 54 can be used prior to a deployment of application 30. For example, a user can use performance module 48 to view and analyze baseline data 54 to determine response times for application 30, stability thresholds, and the like. Based on this analysis, one or more acceleration techniques can be used to improve the performance of application 30 and thereby avoid performance problem(s). In this manner, the risk of deploying application 30 is reduced, a more stable network 18 will be obtained, and an overall cost of the computer infrastructure 12 will be reduced. Additionally, user 17 satisfaction and confidence will be enhanced.

Further, analysis module 49 can determine one or more problems in computer infrastructure 12 based on the evaluation of performance data 50 and/or performance map 52. To this extent, analysis module 49 can correlate one or more anomalies of performance data 50 and/or performance map 52 with a set (one or more) of possible problem resources that can cause the anomalies. For example, an anomaly in an amount of processing time required at client 16 could indicate a lack of sufficient processing, memory, and/or communication resources. Analysis module 49 can drill down into the performance data 50 and/or performance map 52 to identify a likely reason for the increased processing time. Further, analysis module 49 can generate one or more solutions for improving the problem resource (e.g., increase capability, replace resource(s), reduce dependence on resource(s), etc.). In any event, analysis module 49 can present the possible problem resource(s) and/or solution(s) for display to a user and/or communicate them to another system in a known manner.

As discussed herein, one embodiment of the invention provides a method of evaluating a performance of a network-based application. To this extent, FIG. 6 shows illustrative process steps that can be performed according to an embodiment of the invention. Using environment 10 of FIG. 1 as an illustrative example, in step S1, configuration module 46 can decompose a transaction into a plurality of components (e.g., client, network, application server). In step S2, configuration module 46 can identify one or more resources in each component that are used by application 30 and/or browser 32 when processing the transaction. In step S3, configuration module 46 can configure computer infrastructure 12 to obtain performance data 50 for each resource while the transaction is processed. In step S4, application 30 and/or browser 32 can process the transaction. In step S5, performance module 48 can evaluate performance data 50. In step S6, analysis module 49 can determine one or more problem resources based on the evaluation of performance data 50, and in step S7, analysis module 49 can generate one or more solutions for improving the transaction processing.

While shown and described herein as a method and system for evaluating a performance of a network-based application, it is understood that the invention further provides various alternative embodiments. For example, in one embodiment, the invention provides a computer-readable medium that includes computer program code to enable a computer infrastructure to evaluate a performance of a network-based application. To this extent, the computer-readable medium includes program code, such as evaluation system 42 (FIG. 1), that implements one or more of the various process steps described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to evaluate a performance of a network-based application as described herein. In this case, the service provider can manage (e.g., create, maintain, support, etc.) a computer infrastructure, such as application server 14 (FIG. 1), that performs one or more of the process steps described herein for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for evaluating a performance of a network-based application. In this case, a computer infrastructure, such as application server 14 (FIG. 1), can be obtained (e.g., created, maintained, having made available to, etc.) and one or more systems for performing the process steps described herein can be obtained (e.g., created, purchased, used, modified, etc.) and deployed to the computer infrastructure. To this extent, the deployment of each system can comprise one or more of (1) installing program code on a computing device, such as application server 14, from a computer-readable medium; (2) adding one or more computing devices to the computer infrastructure; and (3) incorporating and/or modifying one or more existing systems of the computer infrastructure, to enable the computer infrastructure to perform one or more of the process steps described herein.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Additionally, as used herein the terms "system" and "module" are synonymous and mean any combination of hardware and/or software for performing a particular function.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of evaluating a performance of a network-based application, the method comprising:

decomposing a transaction for the network-based application into a plurality of components, wherein the plurality of components include a client component, a network component, and a server component;

identifying a plurality of resources used by the network-based application, wherein the plurality of resources include a client component resource, a network component resource, and a server component resource;

obtaining individual performance data for each of the plurality of resources on at least one computing device based on a processing of the transaction by the network-based application; and evaluating the performance of the network-based application using the at least one computing device based on the individual performance data obtained for each of the plurality of resources, the evaluating including analyzing an individual resource utilization of each of the plurality of resources by the network-based application when processing the transaction.

2. The method of claim 1, further comprising determining a problem resource from the plurality of resources based on the evaluating.

3. The method of claim 2, further comprising generating at least one solution for improving the problem resource.

4. The method of claim 1, wherein the obtaining step includes simulating an environment for the network component.

5. The method of claim 1, wherein the evaluating step includes comparing the performance data to performance data obtained from a simulated environment for the network component.

6. The method of claim 1, further comprising configuring at least one monitoring tool, wherein the at least one monitoring tool acquires performance data for at least one of the plurality of resources.

7. The method of claim 1, further comprising receiving a performance concern, wherein the obtaining step is performed in response to the performance concern.

8. The method of claim 1, wherein the obtaining step includes increasing a logging detail level for at least one resource.

9. The method of claim 1, further comprising identifying a user session for the transaction, wherein the obtaining step is further based on the user session.

10. A system for evaluating a performance of a network-based application, the system comprising:
at least one computing device including:
a system for decomposing a transaction for the network-based application into a plurality of components, wherein the plurality of components include a client component, a network component, and a server component;
a system for identifying a plurality of resources used by the network-based application, wherein the plurality of resources include a client component resource, a network component resource, and a server component resource;
a system for obtaining individual performance data for each of the plurality of resources based on a processing of the transaction by the network-based application; and
a system for evaluating the performance of the network-based application based on the individual performance data obtained for each of the plurality of resources, the system for evaluating including a system for analyzing an individual resource utilization of each of the plurality of resources by the network-based application when processing the transaction.

11. The system of claim 10, the at least one computing device further including a system for determining a problem resource from the plurality of resources based on the evaluation.

12. The system of claim 11, the at least one computing device further including a system for generating at least one solution for improving the problem resource.

13. The system of claim 10, wherein the system for obtaining includes a system for simulating an environment for the network component.

14. The system of claim 10, the at least one computing device further including a system for receiving a performance concern.

15. The system of claim 10, wherein the system for obtaining includes at least one monitoring tool, wherein the at least one monitoring tool acquires performance data for at least one resource.

16. The system of claim 15, wherein the at least one resource for the client component comprises at least one of: a virtual memory, a file system, a cache, or a Java runtime environment.

17. The system of claim 15, wherein the at least one monitoring tool comprises a network analyzer connected to the network.

18. The system of claim 15, wherein the at least one resource for the server component comprises at least one of: a load balancer, an object manager, a database manager, a web server, and an operating system.

19. The system of claim 15, the at least one computing device further including a system for configuring the at least one monitoring tool.

20. The system of claim 10, the at least one computing device further including a system for identifying a user session for the transaction.

21. A program product stored on a computer-readable storage medium, which when executed, enables a computer infrastructure to evaluate a performance of a network-based application, the program product comprising computer program code for enabling the computer infrastructure to perform the method steps of:
decomposing a transaction for the network-based application into a plurality of components, wherein the plurality of components include a client component, a network component, and a server component;
identifying a plurality of resources used by the network-based application, wherein the plurality of resources include a client component resource, a network component resource, and a server component resource;
obtaining individual performance data for each of the plurality of resources based on a processing of the transaction by the network-based application; and
evaluating the performance of the network-based application based on the individual performance data obtained for each of the plurality of resources the evaluating including analyzing an individual resource utilization of each of the plurality of resources by the network-based application when processing the transaction.

22. The program product of claim 21, wherein the method steps further include determining a problem resource from the plurality of resources based on the evaluation.

23. The program product of claim 22, wherein the method steps further include generating at least one solution for improving the problem resource.

24. The program product of claim 21, wherein the method steps further include configuring a plurality of monitoring tools, wherein each of the plurality of components includes at least one monitoring tool that acquires performance data.

25. The program product of claim 21, wherein the method steps further include receiving a performance concern, wherein the obtaining step is performed in response to the performance concern.

26. The program product of claim 21, wherein the method steps further include identifying a user session for the transaction, wherein the obtaining step is further based on the user session.

27. A method of deploying a system for evaluating a performance of a network-based application, the method comprising:
providing a computer infrastructure including at least one computing device operable to:
decompose a transaction for the network-based application into a plurality of components, wherein the plurality of components include a client component, a network component, and a server component;

identify a plurality of resources used by the network-based application, wherein the plurality of resources include a client component resource, a network component resource, and a server component resource;

obtain individual performance data for each of the plurality of resources based on a processing of the transaction by the network-based application; and evaluate the performance of the network-based application based on the performance data obtained for each of the plurality of resources, the evaluating including analyzing an individual resource utilization of each of the plurality of resources by the network-based application when processing the transaction.

* * * * *

UNITED STATES PATENT AND TRADEMARK OFFICE
CERTIFICATE OF CORRECTION

PATENT NO. : 7,623,463 B2  Page 1 of 1
APPLICATION NO. : 11/223096
DATED : November 24, 2009
INVENTOR(S) : Kavita Chavda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this

Twenty-sixth Day of October, 2010

David J. Kappos
*Director of the United States Patent and Trademark Office*